(12) United States Patent
Mercille et al.

(10) Patent No.: US 10,691,309 B2
(45) Date of Patent: Jun. 23, 2020

(54) MEDIA ELEMENT TRANSITION ELECTRONIC DEVICE, METHOD AND APPLICATION

(71) Applicant: BROADSIGN INTERNATIONAL, LLC., St-Louis, MO (US)

(72) Inventors: Frederic Mercille, Saint-Hubert (CA); Bryan Mongeau, Beaconsfield (CA)

(73) Assignee: BROADSIGN SERV, LLC, St. Louis, MO (US)

( * ) Notice: Subject to any disclaimer, the term of this patent is extended or adjusted under 35 U.S.C. 154(b) by 261 days.

(21) Appl. No.: 13/856,072

(22) Filed: Apr. 3, 2013

(65) Prior Publication Data

US 2014/0298170 A1 Oct. 2, 2014

Related U.S. Application Data

(60) Provisional application No. 61/805,677, filed on Mar. 27, 2013.

(51) Int. Cl.
G06F 3/0484 (2013.01)
H04N 5/262 (2006.01)
G11B 27/031 (2006.01)
G11B 27/10 (2006.01)

(52) U.S. Cl.
CPC .......... *G06F 3/0484* (2013.01); *G11B 27/031* (2013.01); *G11B 27/105* (2013.01); *H04N 5/262* (2013.01)

(58) Field of Classification Search
None
See application file for complete search history.

(56) References Cited

U.S. PATENT DOCUMENTS

| 5,179,543 A * | 1/1993 | Nara | G11B 27/024 360/15 |
| 5,640,522 A * | 6/1997 | Warrin | G06F 3/0481 345/619 |
| 8,560,951 B1 * | 10/2013 | Snyder | G11B 27/034 715/720 |
| 2002/0057386 A1 * | 5/2002 | Otera | G09G 5/00 348/744 |
| 2006/0153531 A1 * | 7/2006 | Kanegae et al. | 386/95 |
| 2008/0019610 A1 * | 1/2008 | Matsuzaka | G06K 9/00711 382/284 |
| 2009/0119595 A1 * | 5/2009 | Morris | G06F 17/30873 715/730 |
| 2010/0250510 A1 * | 9/2010 | Herberger | G10H 1/0025 707/705 |
| 2012/0004982 A1 * | 1/2012 | Cohee | G06Q 30/02 705/14.42 |
| 2012/0210222 A1 * | 8/2012 | Matsuda et al. | 715/716 |
| 2012/0256949 A1 * | 10/2012 | Treat | G09G 5/14 345/629 |
| 2014/0237365 A1 * | 8/2014 | Oberbrunner et al. | 715/722 |

* cited by examiner

*Primary Examiner* — Tuan S Nguyen

(57) ABSTRACT

The present relates to a method, an electronic device and computer readable memory for incorporating a transition effect upon playing subsequent digital media elements. The method, device and computer readable memory concurrently manage a current and next media elements, and render the current and next media elements. The method, electronic device and computer readable memory further apply the transition effect to the current and next media elements; and play the current and next media elements with the applied transition effect.

13 Claims, 3 Drawing Sheets

MEDIA ELEMENT TRANSITION ELECTRONIC DEVICE, METHOD AND APPLICATION

The present relates to digital media element presentation, and more particularly to a media element transition electronic device, method and application.

BACKGROUND

The industry of video playback applications is widespread, with both personal and industrial applications. To play video content on electronic equipment such as a computer, a tablet, an intelligent phone and other electronic devices, a corresponding media player must be installed. Various video formats require different media players, oftentimes reducing the compatibility between media players.

Multiple video media element may further be played subsequently. In such instances, a transition effect between the video media element is usually introduced to render the viewing experience more pleasant and eliminate any abrupt passage between video media element. Currently, software provides pre-production transition effect between video media element. Video media editors such as Final Cut Pro® and Windows Movie Maker® allow users to select and introduce a transition effect between two images or video media element. The resulting video media element is a newly encoded video media element including the two video media element and the selected transition effect in a pre-encoded combined video media element.

Computing the pre-encoded combined video media element with current methodologies and software available today on the market require important processing capability, making its application to real-time solutions unsuitable. There is therefore a need for a media player and a method for adding transition effect between two subsequent video media element, suitable for real time applications such as for example digital signage.

SUMMARY

In a first aspect, the present disclosure relates to a method for incorporating a transition effect upon playing subsequent digital media elements. The method comprises concurrently managing by a media controller executed on a processor a current and next media elements. The method further renders the current and next media elements, applies the transition effect to the current and next media elements by the processor; and plays the current and next media elements with the applied transition effect.

In another aspect, the present disclosure relates to an electronic device for incorporating a transition effect upon playing two subsequent digital media elements. The electronic device comprises a processor for executing computer instructions for controlling, rendering and compositing the two subsequent media elements, the compositing comprising applying the transition effect to the rendered two subsequent digital media elements.

In yet another aspect, the present disclosure relates to a computer readable memory having recorded thereon statements and instructions for execution by a processor, said statements and instructions for incorporating a transition effect upon playing subsequent digital media elements. The statements and instructions comprise code means for concurrently managing a current and next media elements, and code means for rendering the current and next media elements. The statements and instructions further comprise code means for applying the transition effect to the current and next media elements by the processor, and code means for playing the current and next media elements with the applied transition effect.

DETAILED DESCRIPTION

Throughout the present disclosure, the following terminology is used and should be construed as follows:

Media element: any type of digital content such as images, videos, audio solely or in combination.

Transition effect; effect to be applied to pass from one media element to the next media element.

Frame: electronically coded still image in video technology.

Rendering context: instructions corresponding to a container for storing state information related to a media element.

The foregoing and other features of the present electronic device, method and application will become more apparent upon reading of the following non-restrictive description of examples of implementation thereof, given by way of illustration only with reference to the accompanying drawings.

Figure 1:
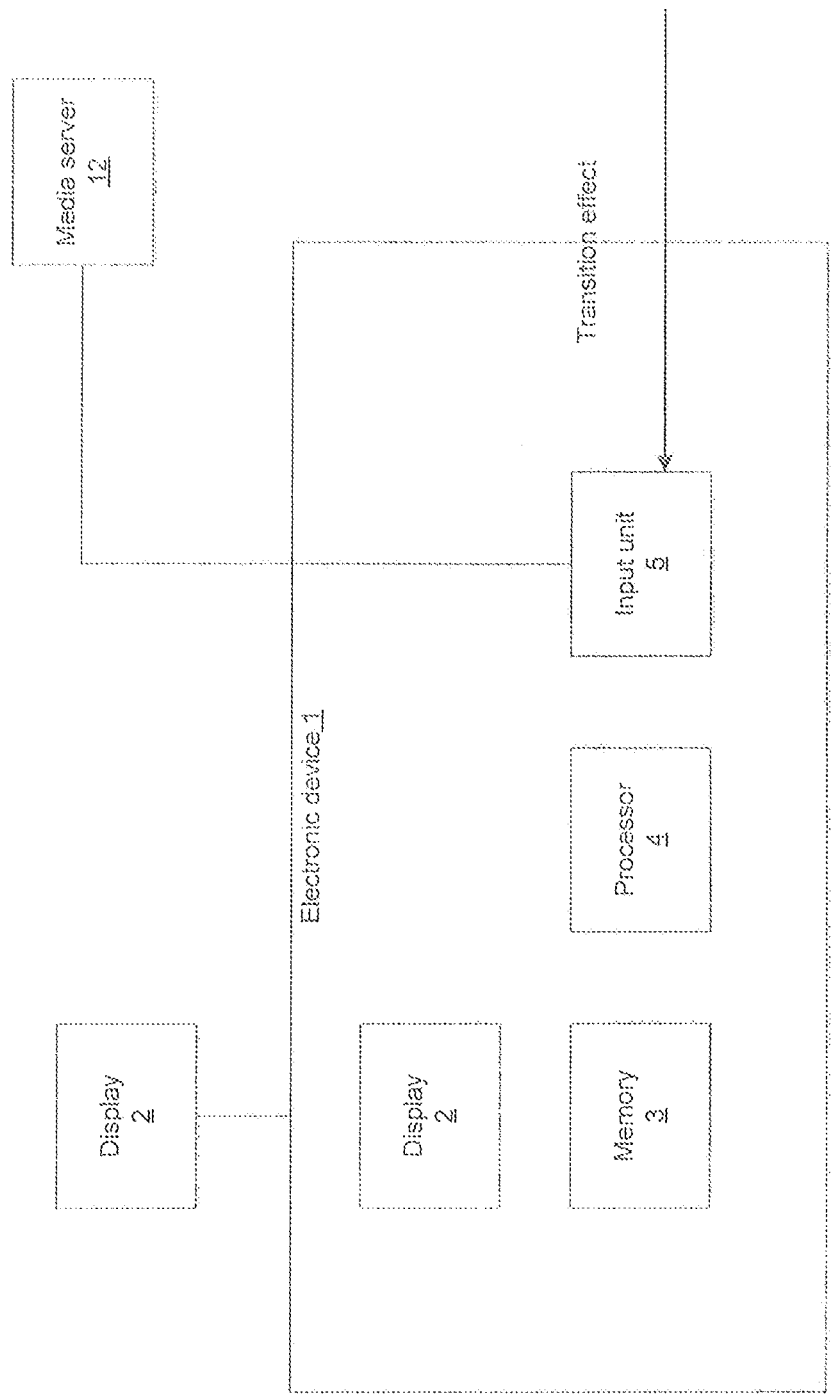
FIG. 1 is a simplified schematic representation of an electronic device.

Referring to FIG. 1, an electronic device adapted for communicating with one or several media servers 12 is shown. The electronic device could be any type of device capable of displaying either directly or ultimately digital media element. The electronic device could for example consist of a computer, a tablet, an intelligent phone or any other type of electronic device for displaying digital media element known in the art. The electronic device 1 either includes or is connected to a display 2. The electronic device 1 also includes memory 3, at least one processor 4 and an input unit 5. The memory 3 could include volatile memory, non-volatile memory. Internal memory, external memory, and any combination thereof. Although only one processor 4 is shown on FIG. 1, the electronic device 1 could include one or several processors capable of executing instructions stored in the memory 3. The input unit 5 could be an input only unit, or an input/output unit. The input unit 5 could be any type of unit allowing entry or receipt of a transition effect instruction from either a user or another electronic device. For example, the transition effect instruction may be received along with indications of the media element to which the transition effect instruction should be applied. The input unit 5 further receives from a media server 12, media element to be displayed.

Figure 2:
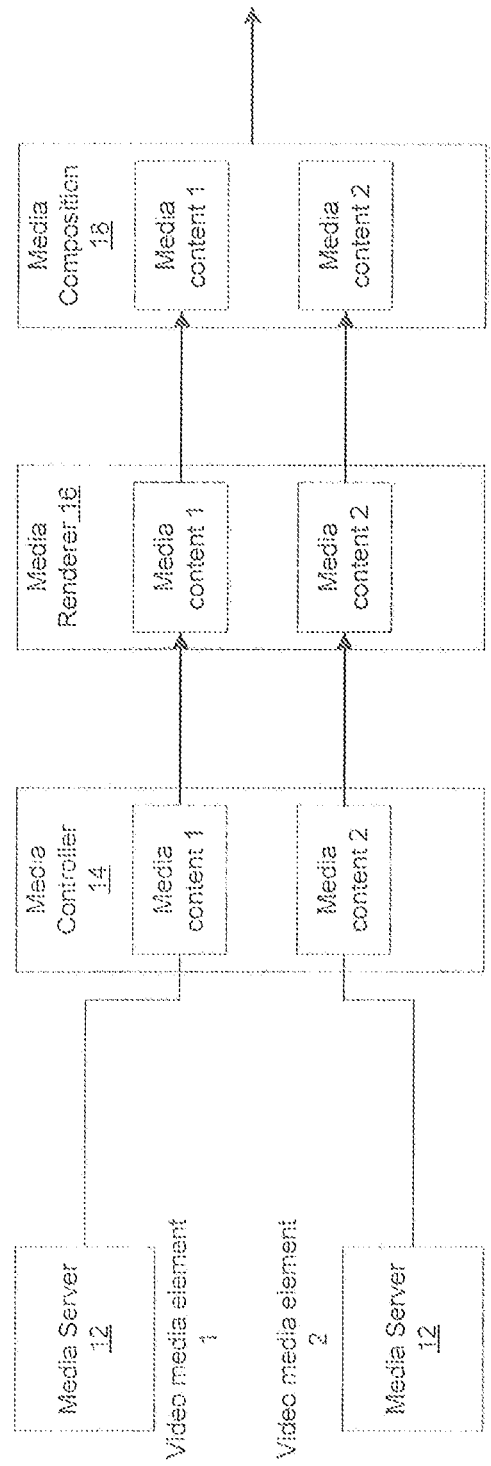
FIG. 2 is schematic representation of a electronic device for effectuating real-time transition effect.
Figure 3:
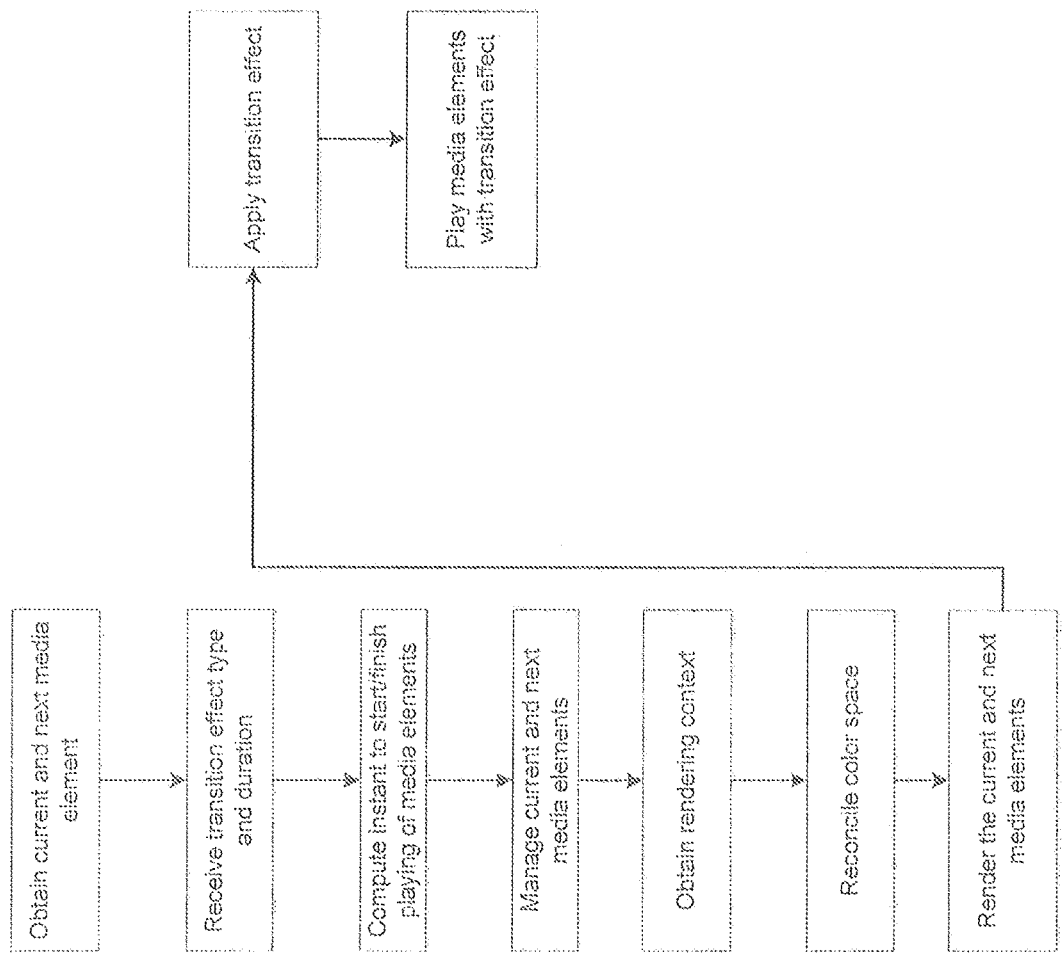
FIG. 3 is a block diagram of the present method.

Reference is now made concurrently to FIGS. 1-3. FIG. 2 represents components as defined by the Digital Living Network Alliance, but is not limited to such a configuration. Media element to be downloaded and displayed is stored in one or a plurality of media servers 12. Although two media servers 12 are shown on FIG. 1, the present disclosure is not limited to two media servers 12, and could use only one media server 12, or a plurality of media servers 12. The media servers 12 may be local, remote, or a combination thereof. Furthermore, the media servers 12 may either be accessible electronically or wirelessly. The media servers 12 may store various types of media element, such as images, videos, audio, etc. The media servers 12 may store media element in various formats, such as: mpg, mov, wmv, rm, pdf, jpeg, avi, mp3, mp4, or any other format known to the media element industry.

A media controller 14 accesses the media servers 12 to download the media element of interest. To assist in the description of the present electronic device and method, two video media element are shown as being extracted from the media servers 12, but the present electronic device and method are not limited to video media element. The video media elements are labeled as video media element 1 and video media element 2, to schematically represent an ordering in the subsequent presentation of the video media element. The video media element 1 and the video media element 2 are used for exemplary purposes in the following description, so as to facilitate the reading, and should not be construed as limiting the present electronic device and method to such a specific media element type.

The media controller 14 consists of computer-implemented instructions which, when executed by the processor 4, are adapted for supporting playing concurrently two media element. For doing so, the media controller 14 stores in the memory 3 the media element of interest, which in the present example consists in video media element 1 and video media element 2. More particularly, the media controller 14 is adapted to playback two media element of interest on one frame at a particular instant. For example, during the transition effect between two subsequent video media element, the previous video media element is not yet done playing and must complete (also referred herein as current medium content) while the next video media element must start playing (hereby referred to as the next media element).

The media controller 14 is responsible for managing timing and execution of the transition effect between the two subsequent media element. For this reason, the media controller 14 receives the transition effect and the two media element. The transition effect is an instruction defining the transition effect type and transition effect duration to be applied for passing from the current media element to the next media element. The transition effect type and transition effect duration provide the framework within which the media controller 14 must perform the transition effect between the current media element being played and the next media element to be played. The transition type defines whether: 1) the two subsequent media element overlap and the duration of the overlap (e.g. crossfade); and 2) special effect to be applied on the two subsequent media element (e.g. fading).

Based on the transition effect duration and the transition effect type, the media controller 14 computes the instant when to start applying the transition effect to the current and next media element on whether or not an overlap exists. In the case where the transition effect corresponds to an overlap, the transition effect is applied to the current media element X seconds before the current media element is expected to end, where X corresponds to the transition duration. If the transition effect does not require an overlap between the current media element and the next media element, then the media controller 14 introduces the transition effect X/2 seconds before the current media element is expected to end, and ends the transition effect X/2 seconds after the next media element begins playing, therefore displaying the transition effect between the current media element and the next media element of total duration of X seconds.

Thus, in the case where there is an overlap, the media controller 14 concurrently manages the current media element and the next media element. During the transition effect, both the current media element and the next media element are monitored by the media controller 14. The current media element is monitored with a first time monitor to ensure it plays to completion and take appropriate actions if it doesn't (e.g. report a truncated media element), while the next media element must be monitored to ensure its starting time is properly stored with a second time monitor. The media controller 14 must also consider instances where exceptional events occur, such as receiving a trigger forcing an immediate playback of a another media element (therefore interrupting both the current and the next media element at the same time), or preparing playback of another media element which requires a full screen display when the frame of the display the media controller 14 manages usually occupies but a portion of the display (therefore nullifying the transition effect since the current and the next media element don't play on the same frame display as the another media element requiring the full screen display).

The media controller 14 may further include the functionalities known in the art related to a media renderer 16, or the media renderer 16 may be a separate unit as shown on FIG. 2. In order for two media elements to be rendered simultaneously, the current media element and the next media element must share a rendering context. The rendering context depends on the type of media element and window characteristics. The rendering context may be stored in a cache memory of the electronic device, or in a cache memory associated with the processor or the media renderer 16. The rendering context may be different for different windows of the display(s) controlled by the electronic device. For example, when the electronic device controls many windows concurrently on one or several displays, a cache memory of rendering contexts, one associated to each window, is stored for fast access. When one of the current and next media elements is to be rendered for the first time on a particular window, it queries the cache memory for obtaining the corresponding rendering context associated to the window it needs to appear on. If such a rendering context already exists, it is provided to the media renderer, which then uses it to render the media element. If there is no stored rendering context associated to the corresponding window in which the media element is to be displayed, a new rendering context is then created and stored in the cache memory, so as to be used for displaying other media on that particular window. The procedures described below involve rendering and compositing to a 3D hardware accelerated surface. For simplicity's sake and because it is available to most platforms, OpenGL will be referred to. However, these techniques could also be used with Direct3D® or other equivalent technologies.

After the media context has been obtained, the current media element and the next media element are composited. Those skilled in the art will appreciate that the composition may be performed in different sequences, depending on the processing power and memory available, and also on the format of the media element to be displayed. For example, the current media element may be composited first, and then the next media element is composited while the current media element is played, and before the transition effect is to be applied. Compositing of the current and next media element is done by converting each of the current and next media elements to one or more corresponding OpenGL textures, then using those corresponding textures to produce the final result. Those corresponding textures can be generated either with static content (e.g. images), or dynamically updated during composition (e.g. HTML content, video frames).

Different media formats have pixel data in different color spaces. As an example, most industry standard video libraries decode a video file and provide a programmer with video frames which are encoded in the YUV420p color space. Some other video decoders will provide YUV422 or NV12 frames. On the other hand, image content will typically be accessible as RGB data. All those color formats need to be reconciled into a common format in order to be used and displayed in a single rendering context. For example, converting YUV data to RGB data may be done as follows:

$$R=1.1643*(Y-0.0625)+1.5958*(V-0.5);$$

$$G=1.1643*(Y-0.0625)-0.39173*(U-0.5)-0.8129*(V-0.5); \text{ and}$$

$$B=1.1643*(Y-0.0625)+2,017*(U-0.5).$$

Those skilled in the art will know that content encoded in YUV420p is a packed format that will consist of 3 chunks of data (Y, U and V) that need to be individually sampled in order to compute each pixels' color. Each of those 3 chunks are then uploaded to a graphics engine (either run as instructions on the processor or on a separate graphical card) as a separate texture, and the RGB value of each pixel is computed by sampling the appropriate value within each of those 3 textures. On the other hand, YUV422 is a planar format and must therefore be uploaded to the graphics engine as a single chunk, and each pixel RGB value is then computed from the appropriate UYVY quadruplet.

For high bandwidth media element (such as 1080p videos playing at 30 fps), converting each pixel from YUV420p to RGBA in real time would unduly hinder the playback performance and degrade the viewing experience considerably. To solve this problem, specialized transformation mechanisms known as pixel shaders are used to do post-processing of raw pixel color data by reprogramming a graphics pipeline in real time in order to achieve the desired result without having to convert the pixel color data values independently. A different fragment shader is precompiled for each supported color space, and the appropriate fragment shader is installed on the graphics pipeline according to the color space of the media element to reconcile. When two media element that need to be reconciled have different color spaces, the fragment shader corresponding to the previous content is installed and the previous content is rendered, then the fragment shader corresponding to the next content is installed and the second content is rendered. In the case where a media element is already in the RGB color space, all fragment shaders are then uninstalled from the graphics pipeline before rendering the media element.

In addition to reconciling the color space, the media composition 18 further handles computation related to the transition effect type to be applied to the current and next media element. Some transition effect type, such as for example panning, zooming, further require to change on-screen coordinates of individual pixels of some frames of the current media element and/or the next media element. To produce a cross fade transition effect type, color weight values of corresponding pixels from the current media element and the next media element are averaged to obtain an averaged color weight value for the pixels selected. The cross fade may be done gradually by increasing over the transition duration the number of pixels of both the current and next media element being transitioned. Alternately, the cross fade may consist in increasing over the transition duration the weight given to the pixels of the next media element with respect to the weight given to the current media element. To produce a wipe transition effect, pixels forming a selected shape or corresponding to a particular section of the frame may be selected from the next media element to be displayed instead of the corresponding pixels of the current media element, and enlarged over the transition duration so as to increasingly occupy the frame and replace the current media element by the end of the transition duration. Depending on the media type involved, the transition effect type may require heavy computation which has to be performed and completed sufficiently fast to not slow down rendering of the current and next media element. In a particular embodiment, to obtain acceptable performance and not weigh too heavily on the processor, transition effects are done by means of graphics Application Program Interface using a Graphic Processing Unit for its heavy compositing computation capability (such as for example Direct3D® on Microsoft® operating systems and Open Graphics Library on most other platforms).

Different kinds of transition effects require different kinds of post-processing in order to be performed by the media composition 18. All transition effects are animated based on a single variable representing a progress of the transition, hereinafter called the animation variable. The animation variable starts with a value of 0.0 at the beginning of the transition effect and gradually increases to reach the value of 1.0 at the end of the transition effect. The animation variable varies based on time, and can increase following one of different curves, be it linear, sinusoidal, logarithmic, exponential, or any other curve shape that may provide a visually pleasing transition effect. The transition effects and related computations can be processed either by the processor by computing relevant vertex coordinates or base color values and making the appropriate OpenGL calls with those values, or they can be delegated to specialized shaders which would perform the transition effects computation on the GPU.

For a transition effect type "fade out to black then fade in from black", the current content gradually fades out to black, then when the current media element is done playing, the next media element starts from black and gradually fades in to full view. This transition effect contains no overlap between the current content and the next content. For the first half of the transition (when the animation variable varies from 0.0 to 0.5), the base color used to render the current content varies from full white (1.0, 1.0, 1.0, 1.0), to full black (0.0, 0.0, 0.0, 1.0), by following the animation variable through the shades of grey (1.0-2*value, 1.0-2*value, 1.0-2*value, 1.0). Once full black is achieved, the current media element stops playing and the new media element starts playing. For the remaining of the transition effect (i.e. when the animation variable varies from 0.5 to 1.0), the base odor used to render the next media element varies from full black to full white, by following the animation variable through the shades of grey (2*(value—0.5), 2*(value—0.5), 2*(value—0.5), 1.0).

For a transition effect type "crossfade", the current media element remains fully visible until it is completely played, but the next Media element gradually fades into view over the current media element, effectively blending into it, until it becomes Rally opaque and completely blocks out the current media element. The transition effect is achieved by displaying the current media element as if it were slightly further away from a camera than the next media element. When the transition effect starts, both current and next media elements are displayed with a base color of full white, but the animation variable controls the alpha value of the next content. Therefore, at the beginning of the transition effect when the animation variable value is 0.0, the base color of the next media element is fully transparent white (1.0, 1.0, 1.0, 0.0), and it transitions to fully opaque white (1.0, 1.0, 1.0, 1.0) with the alpha value following the animation variable (1.0, 1.0, 1.0, value).

For the transition effect of the type 'star wipe', the current media element remains fully visible until the very end of its displaying while the next media element gets partially displayed as it is clipped into the shape of a star which grows in size during the transition period until it occupies the whole frame. A 5 pointed star (although a similar process can be used for stars with any number of points) is produced by placing 10 vertices around a circle which is centered on the center of the next media element to be displayed. Those vertices are equally spaced out around the circle at the following angles (in degrees): 18, 54, 90, 126, 162, 198, 234, 270, 306 and 342. Every other vertex is then moved 2.5 times further away from the center of the circle than the reference circle in order to form the shape of a five-pointed star.

For the duration of the transition effect, the animation variable drives the diameter of the reference circle, going from a 0.0 diameter when the animation variable value is 0.0, to a diameter corresponding to the diagonal length of the frame when the animation variable value reaches 1.0. When rendering at any time during the transition effect, the coordinates of those 10 vertices are computed in conjunction with the associated texture coordinates for the next media element so that the total content being rendered does not get distorted.

For the transition effect of the type "page turn", the next media element starts playing in the background while the current media element is moved off the frame with an animation that simulates a page turning. During the page turning animation, the back of said page can be seen for a brief moment. The back of the page displays as a plain gray area by default, but it can be configured to display an image which the user can modify in order to briefly display his brand between the current and the next media element. The next media element is fully visible during the length of the transition effect, albeit being displayed behind the previous content, therefore partially obscured. As soon as the transition effect starts, the previous content no longer gets displayed simply as two triangles forming a rectangle. It is instead replaced by a mesh of hundreds or thousands of triangles (the exact amount varies depending on the desired smoothness of the animation). Each vertex in the mesh is associated to the texture coordinates that corresponds to its position. The mesh is then animated in 3D such that it simulates the effect of a page turning and moving away from the frame.

In a particular aspect, the media controller 14, the media renderer 16 and the media composition 18 may be implemented as computer readable memory having recorded thereon statements and instructions for execution by the processor.

Effect on Digital Signage Loop Inventory Calculations

In a digital signage system, inventory calculations need to be made in order to ensure a loop composed of a plurality of subsequent media element is not overbooked. Digital signage loop composition and inventory is described in U.S. Pat. No. 8,170,914 which is incorporated by reference herein.

When setting a transition effect between two subsequent media elements, the transition's type and duration will have an effect on the inventory calculation. For example, consider a 2 minute loop with 12 10-second slots. Without transition effects, this loop is fully booked. However, with a 1-second crossfade (a transition type that overlaps two media elements), the actual playback time is reduced to 108 seconds, freeing up enough space to book another 12 second slot with additional media element.

The algorithm for inventory control needs to take into account the transition type and duration at the moment of booking the loop. If the transition type is non-overlapping (for example fade-in/fade-out), then no additional calculations needs to be made. However, if the transition type is overlapping (for example—crossfade), then the algorithm needs to subtract the transition duration from a reserved slot length. In one embodiment, when two media elements are back-to-back, the transition type between them is dictated by the following media element. For example, consider two media elements in a loop: Video 1 (10 seconds with 1 second cross fade) and Video 2 (10 seconds with 2 second page turn animation). Thus when Video 1 is reserved for inventory, the slot length booked will be 9 seconds, whereas for Video 2, the slot length will be 8 seconds.

Although the present electronic device, method and application have been described in the foregoing description by way of illustrative embodiments thereof, these embodiments can be modified at will, within the scope of the appended claims without departing from the spirit and nature of the appended claims.

What is claimed is:

1. A method for incorporating a transition effect at a digital signage electronic device, the method comprising:
   creating by the digital signage electronic device a digital signage loop comprising one or more reserved time slot and an available time slot, each reserved time slot being associated to a corresponding digital media element, the available time slot not being associated with any digital media element, a combined length of the one or more reserved time slot and the available time slot being equal to a pre-defined length of the digital signage loop;
   receiving via an input unit of the digital signage electronic device at least two digital media elements from at least one remote media server;
   updating by the digital signage electronic device the digital signage loop by creating one additional reserved time slot for each one of the at least two digital media elements, and reducing the length of the available time slot by a combined length of the additional reserved time slots; and
   receiving via the input unit of the digital signage electronic device a transition effect instruction, the transition effect instruction identifying two of the digital media elements from the at least two digital media elements to which the transition effect is to be applied, the transition effect instruction comprising a transition effect type defining a type of effect to be applied when playing one of the identified digital media elements and transitioning to playing another one of the identified digital media elements;
   wherein the transition effect instruction further comprises a transition effect duration; if the type of effect to be applied is overlapping, then the transition effect duration is subtracted from the length of one of the additional reserved time slots and the transition effect duration is further added to the length of the available time slot; and if the type of effect to be applied is not overlapping, then no modification is made to the digital signage loop.

2. The method of claim 1, further comprising obtaining rendering contexts for the digital media elements.

3. The method of claim 2, wherein the rendering contexts further comprises reconciling color space of the two subsequent digital media elements.

4. The method of claim 1, wherein the transition effect is applied by a media composition executed by the processor.

5. The method of claim 1, wherein the transition effect type is one of cross fade, turning page, start swipe, fade out-fade in.

6. A digital signage electronic device for incorporating a transition effect, the digital signage electronic device comprising:
   memory for storing a digital signage loop comprising one or more reserved time slot and an available time slot, each reserved time slot being associated to a corresponding digital media element, the available time slot not being associated with any digital media element, a combined length of the one or more reserved time slot and the available time slot being equal to a pre-defined length of the digital signage loop;
   an input unit for receiving at least two digital media elements from at least one remote media server and for receiving a transition effect instruction from a remote electronic device, the transition effect instruction identifying digital media elements to which it is to be applied and comprising a transition effect type defining a type of effect to be applied for passing from one of the identified digital media elements to the other one of the identified digital media elements; and
   a processor for executing computer instructions for updating the digital signage loop by creating one additional reserved time slot for each one of the at least two received digital media elements, and reducing the length of the available time slot by a combined length of the additional reserved time slots; and further applying the transition effect when playing and transitioning between the identified digital media elements;
   wherein the transition effect instruction further comprises a transition effect duration; if the type of effect to be applied is overlapping, then the transition effect duration is subtracted from the length of one of the additional reserved time slots and the transition effect duration is further added to the length of the available time slot; and if the type of effect to be applied is not overlapping, then no modification is made to the digital signage loop.

7. The digital signage electronic device of claim 6, wherein the applying the transition effect to the digital media elements is applied prior to playing the media elements.

8. The digital signage electronic device of claim 6, wherein the applying the transition effect to the digital media elements is applied while playing the digital media elements.

9. The digital signage electronic device of claim 6, wherein the transition effect type is one of cross fade, turning page, start swipe, fade out-fade in.

10. A non-transitory computer readable memory having recorded thereon statements and instructions for execution by a processor of a digital signage electronic device, said statements and instructions comprising:
    code means for creating a digital signage loop comprising one or more reserved time slot and an available time slot, each reserved time slot being associated to a corresponding digital media element, the available time slot not being associated with any digital media element, a combined length of the one or more reserved time slot and the available time slot being equal to a pre-defined length of the digital signage loop;
    code means for receiving via an input unit of the digital signage electronic device at least two digital media elements from at least one remote media server and for receiving a transition effect instruction from a remote electronic device, the transition effect instruction identifying the digital media elements to which it is to be applied and comprising a transition effect type defining a type of effect to be applied when playing and transitioning from one of the identified digital media elements to the other one of the two identified digital media elements; and
    code means for updating the digital signage loop by creating one additional reserved time slot for each one of the at least two digital media elements, and reducing the length of the available time slot by a combined length of the additional reserved time slots;
    wherein the transition effect instruction further comprises a transition effect duration; if the type of effect to be applied is overlapping, then the statements and instructions comprise code means for subtracting the transition effect duration from the length of one of the additional reserved time slots and for further adding the transition effect duration to the length of the available time slot; and if the type of effect to be applied is not overlapping, then no modification is made to the digital signage loop.

11. The computer readable memory of claim 10, wherein the transition effect to the rendered digital media elements is applied prior to playing the identified digital media elements.

12. The computer readable memory of claim 10, wherein the transition effect to the rendered digital media elements is applied while playing the identified digital media elements.

13. The computer readable memory of claim 10, wherein the transition effect type is one of cross fade, turning page, start swipe, fade out-fade in.

* * * * *